United States Patent [19]
Peters

[11] 3,915,611
[45] Oct. 28, 1975

[54] BLOW MOLDING APPARATUS

[75] Inventor: Donald L. Peters, Bartlesville, Okla.

[73] Assignee: Phillips Petroleum Company, Bartlesville, Okla.

[22] Filed: Apr. 22, 1974

[21] Appl. No.: 462,876

Related U.S. Application Data

[62] Division of Ser. No. 272,962, July 18, 1972, Pat. No. 3,821,344.

[52] U.S. Cl. ............................. 425/290; 425/387 B
[51] Int. Cl.² ................. B29C 17/07; B29C 17/14
[58] Field of Search ....... 425/290, 387 B, DIG. 214; 264/156, 163, 296, 154, 155

[56] References Cited
UNITED STATES PATENTS

| | | | |
|---|---|---|---|
| 3,004,285 | 10/1961 | Hagen | 425/387 B |
| 3,050,773 | 8/1962 | Hagen | 264/98 |
| 3,300,556 | 1/1967 | Buttenfeld et al. | 264/98 |
| 3,499,067 | 3/1970 | Rogers | 264/154 |
| 3,597,793 | 8/1971 | Weiler | 425/387 B |

*Primary Examiner*—Al Lawrence Smith
*Assistant Examiner*—Robert C. Watson

[57] ABSTRACT

Apparatus is provided for blow molding a hollow article having a plurality of openings thereinto. The apparatus has a multipart mold, means for inserting a parison into a cavity of the mold, means for injecting fluid into the mold contained parison, a movable sleeve slidably mounted within an opening through a wall of the mold, a mandrel positioned in the sleeve, and means for intermittently, independently moving the sleeve and the mandrel for forming an opening in the parison defined by a neck.

18 Claims, 5 Drawing Figures

BLOW MOLDING APPARATUS

This application is a division of copending application Ser. No. 272,962, filed July 18, 1972, now U.S. Pat. No. 3,821,344.

It is desirable to provide apparatus for blow molding a hollow article having an opening defined by a neck.

This invention therefore resides in apparatus for blow molding a hollow article having an opening thereinto. The apparatus has a multipart mold, means for inserting a parison into a cavity of the mold, means for injecting fluid into the mold contained parison, a movable sleeve slidably mounted through an opening through a wall of the mold, a mandrel positioned in the sleeve, and means for intermittently, independently moving the sleeve and the mandrel for forming an opening in the parison defined by a neck of the parison.

Other aspects, objects, and the several advantages of this invention are apparent to one skilled in the art from a study of this disclosure, the drawings, and the appended claims.

The drawings are diagrammatic views of the apparatus of this invention.

Figure 1:
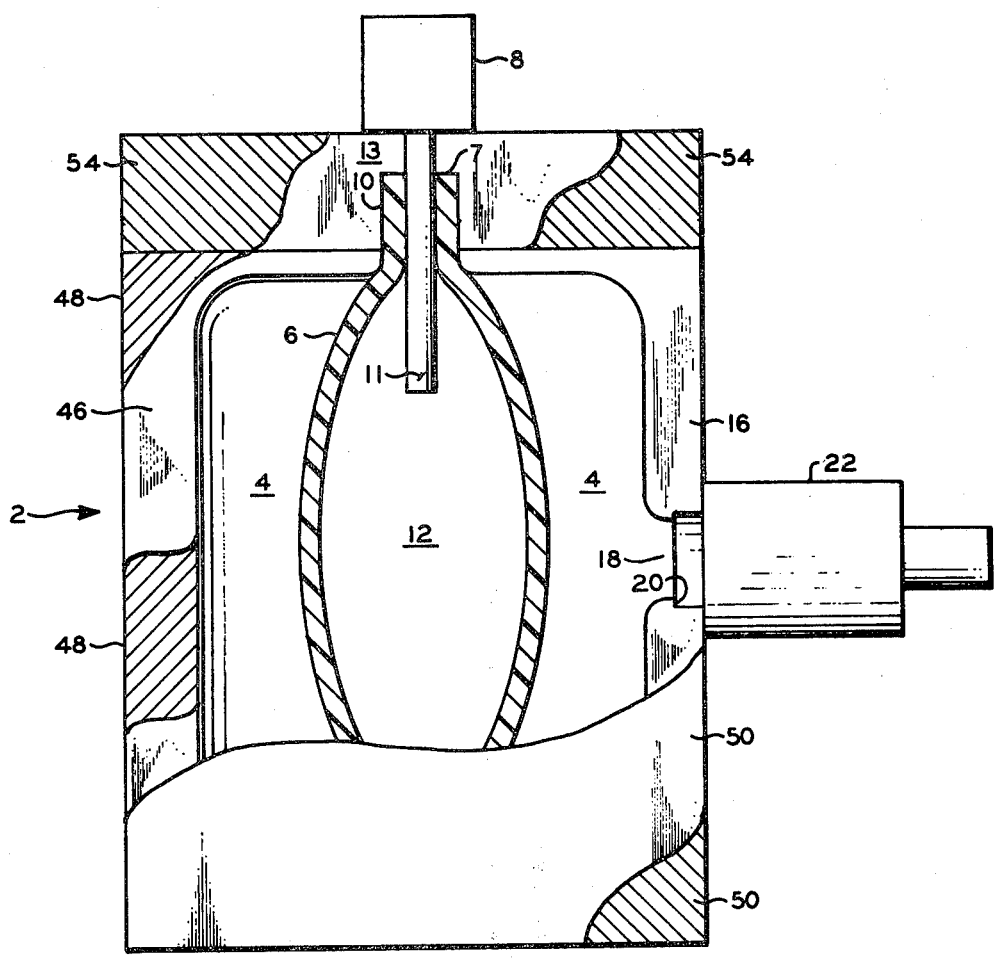
Figure 2:
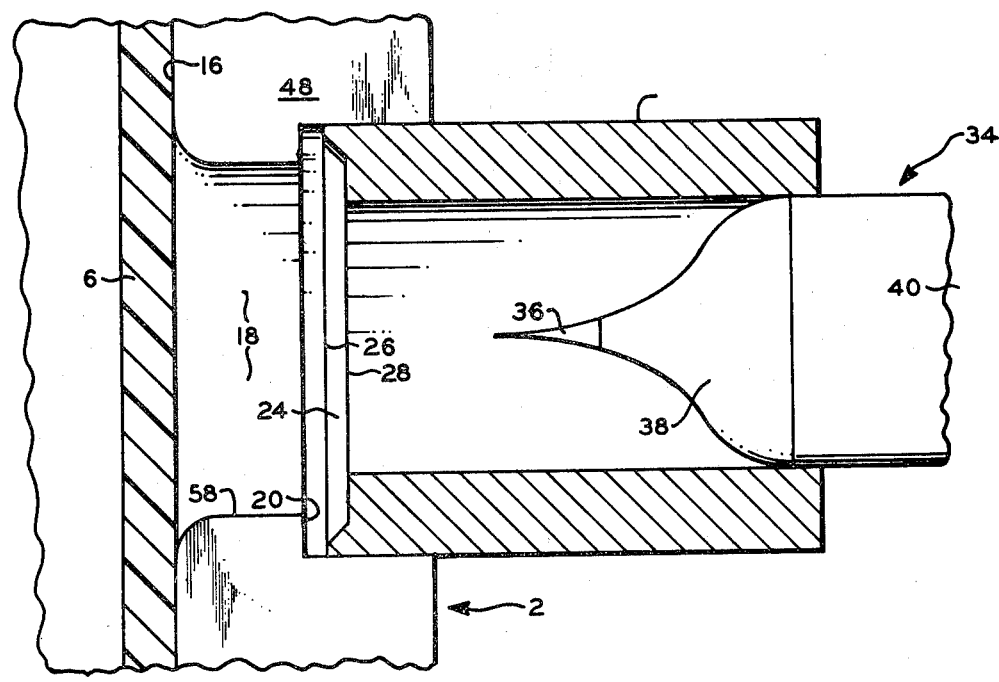
Figure 3:
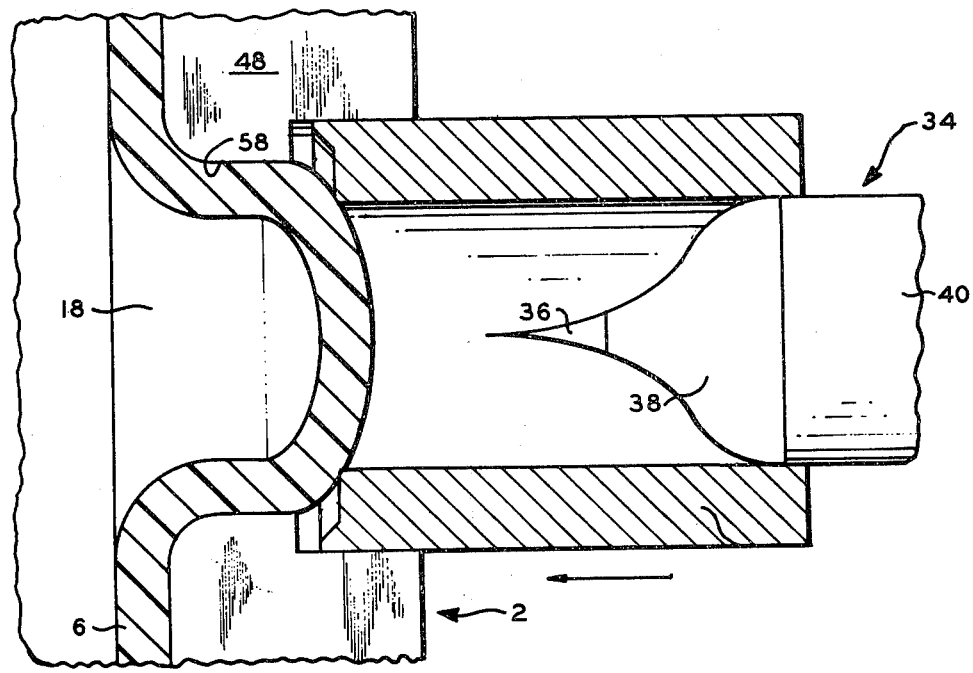
Figure 4:
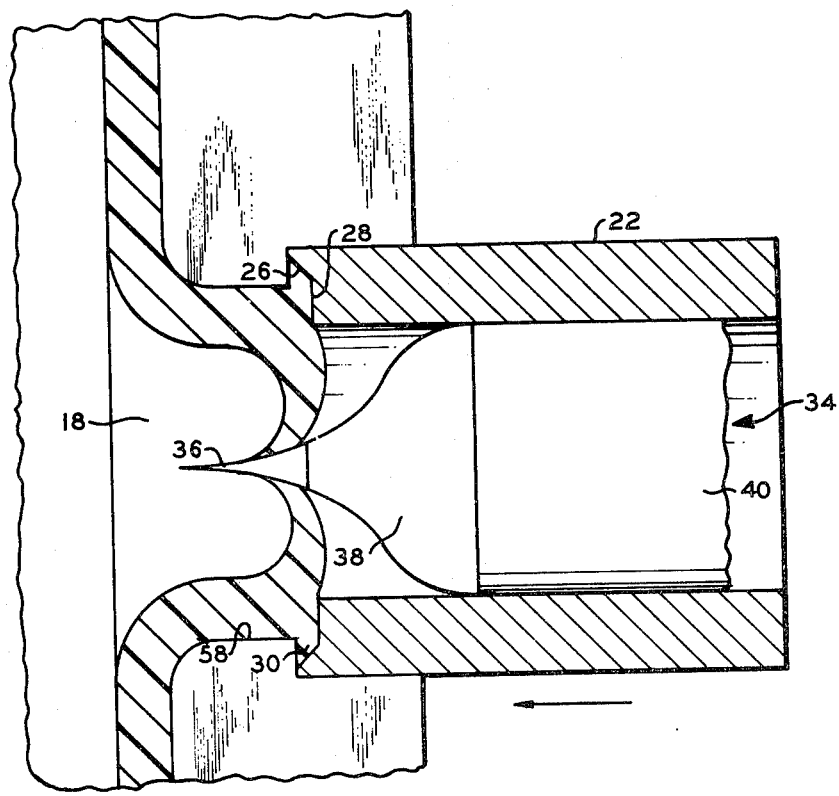
Figure 5:
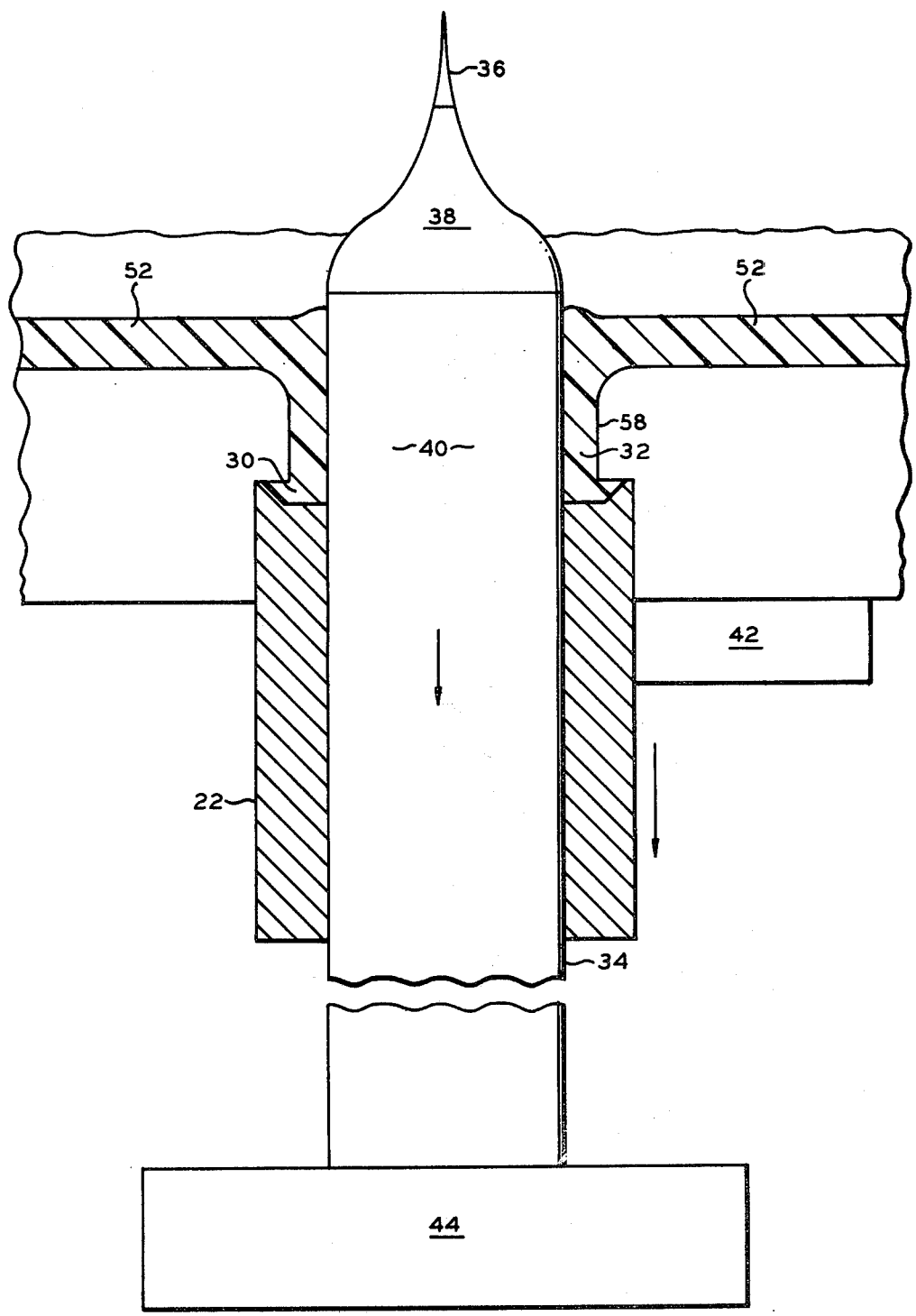

FIG. 1 shows a diagrammatic view of a mold, first opening and neck forming apparatus, and a second opening and neck forming apparatus, FIG. 2 shows a portion of the mold, second opening and neck forming apparatus with the sleeve and mandrel at their first position, FIG. 3 shows the apparatus of FIG. 2 with the sleeve moving toward the second position, FIG. 4 shows the apparatus of FIG. 2 with the sleeve at the second position and the mandrel moving toward the second position, and FIG. 5 shows the mandrel and sleeve at the second position and starting to return to their first positions.

Referring to FIG. 1, split mold 2 comprising at least two separable mold parts has a cavity 4 for receiving a parison 6 from inserting apparatus 8. The mold halves close about said parison 6 trapping the upper portion thereof between neck portion 13 of mold 2 and blow pin 11 forming a first opening 7 and forming a first neck portion 10 on the parison 6 while injecting fluid via blow pin 11 into a chamber 12 of the parison 6 for blow molding a hollow article, as known in the art.

Referring to FIG. 1 and FIGS. 2-5, the mold 2 has a wall 16 having a second opening 18 formed therethrough with an annular shoulder 20 formed on the walls defining the second opening 18. The opening is conveniently located in a lateral portion of the mold in the parting line area although not restricted to that location.

A sleeve 22 has a first end 24 slidably mounted within the second opening 18 of the mold 2. The sleeve 22 is movable between a first position (FIG. 2) at which the first end 24 is spaced from the shoulder 20 and a second position (FIG. 4) at which the first end 24 of the sleeve 22 is contacting the shoulder 20.

The first end 24 of the sleeve 22 preferably has first and second annular portions 26, 28 (see FIG. 2) that are of different elevations with said first annular portion 26 being of a configuration for annularly contacting the shoulder 20 at the second position of the sleeve 22 with the second annular portion 28 being spaced from said shoulder 20 at said second position. With this configuration, a neck-lip 30 (see FIG. 5) can be formed on the second neck 32 of the article as hereafter more fully described.

A mandrel 34 having a first end portion 36, a middle portion 38, and a second end portion 40 is slidably mounted within the sleeve 22 at the first end of portion 36 adjacent the mold cavity 4. The mandrel 34 is movable between a first position (see FIG. 2) at which the middle portion 38 is spaced along the sleeve 22 from the first end 24 thereof and a second position (see FIG. 5) at which the middle portion 38 of the mandrel extends into the mold cavity 4.

First and second means 42, 44 are connected to the respective sleeve 22 and mandrel 34 for intermittently moving these associated elements between their first and second positions at preselected times during blow molding of an article from a parison.

These means 42, 44 can comprise hydraulic cylinders, cams, time delay apparatus, limit switches, and other apparatus as known in the art for intermittently moving associated elements during process cycles.

It is preferred that the first end of portion 36 of the mandrel 34 be of a configuration for piercing the parison during movement of the mandrel 34 from the first to the second position. Such a configuration could be a point or a knife edge.

The diameter of the second end portion 40 of the mandrel is less than the diameter of the second opening 18 adjacent the mold cavity 4 for forming the second neck on the molded article about the second opening of the molded article.

It is also preferred that the sleeve 22 and a second end portion of the mandrel 34 be of a cylindrical configuration for forming a generally cylindrical second neck 32, preferably on about the parting line 46 (see FIG. 1) of the mold halves 48, 50 (see FIG. 2). This placement will provide for more easy construction, operation, and servicing especially if positioned on the extruder side of the mold.

Although the second neck and opening 32, 52 of the molded article are here shown on the side thereof, it should be understood that the molded article can be of any configuration and the second neck and opening 32, 52 can be positioned at any location relative to the first neck 10 formed by neck forming apparatus 54 of FIG. 1 when a suitable multipart mold is used so that stripping of the part is possible. It should also be understood that there can be a multiplicity of necks and openings formed on the container by the apparatus of this invention.

To use the apparatus of this invention, the hollow parison 6 is positioned within a cavity of the mold 2. The mold 2 is closed about the parison and fluid is passed into the parison 6 via blow pin 11 for expanding the parison outwardly and forming a first opening defined by a first neck 10.

Injection is continued to expand the wall portion 58 of the parison 6 (see FIG. 3) into an opening 18 through a wall 16 of the mold 2. Portions of the parison in the opening 18 are forced outwardly relative to wall portions 58 of the opening (see FIG. 4) for forming an annular neck-lip 30 on the molded article.

The wall portion of the parison on the opening 18 is perforated and the mandrel 34 is passed through the perforation of the wall portion of the parison in the opening 18 for forcing portions of the parison in the opening 18 outwardly against the wall portions 58 of the opening between the mandrel 34 and the wall portions of the opening 18 for sizing the second opening 52 in the parison and forming a second neck 32 about said opening 52 with said neck 32 terminating at the neck-lip 30. The neck-lip 30 can be formed during perforating of the wall portion of the parison or prior to said perforating.

While the invention has been described in conjunction with a presently preferred embodiment, it obviously is not limited thereto and the molded article can be formed with only one neck by the sleeve and mandrel assembly of this invention.

I claim:

1. Apparatus for blow molding a hollow article having an opening thereinto, comprising:
   a mold;
   means for inserting a parison into a cavity of the mold;
   means for injecting fluid into the mold-contained parison;
   a sleeve means slidably mounted within a passage through a wall of said mold and having a first end means for contacting a shoulder of said passage, said sleeve means being movable between a first position at which said first end means of said sleeve means is spaced from said shoulder of said passage and a second position in which said first end means of said sleeve means is contacting said shoulder;
   a mandrel means having a first end portion, a middle portion, and a second end portion, and being slidably mounted within said sleeve means between a first position at which said middle portion is spaced along the sleeve means from the first end thereof and a second position wherein said middle portion of said mandrel means extends into the mold cavity;
   means for moving said sleeve means between its first and second positions; and
   means for moving said mandrel means between its first and second positions.

2. An apparatus in accordance with claim 1 wherein said first end of said mandrel means comprises means for piercing said parison during movement of said mandrel means from its first position to its second position.

3. An apparatus in accordance with claim 1 wherein said first end means of said sleeve means has first and second annular portions of different elevations, said first annular portion being of a configuration for contacting said shoulder of said passage when said sleeve means is in its second position, and said second annular portion being located inwardly from said first annular portion and being spaced from said shoulder of said passage when said sleeve means is in its second position.

4. An apparatus in accordance with claim 1 wherein said second end portion of said mandrel means is of a cylindrical configuration.

5. An apparatus in accordance with claim 1 additionally comprising means for forming a neck about the opening of said hollow article, said means for forming a neck comprising the diameter of said second end portion of said mandrel means being less than the diameter of said passage adjacent the mold cavity.

6. An apparatus in accordance with claim 5 wherein said first end means of said sleeve means has first and second annular portions of different elevations, said first annular portion being of a configuration for contacting said shoulder of said passage when said sleeve is in its second position, and said second annular portion being located inwardly from said first annular portion and being spaced from said shoulder of said passage when said sleeve means is in its second position.

7. An apparatus in accordance with claim 6 wherein said first end means of said mandrel is of a configuration for piercing said parison during movement of said mandrel means from its first position to its second position.

8. An apparatus in accordance with claim 7 wherein said second end portion of said mandrel means is of a cylindrical configuration.

9. Apparatus in accordance with claim 1 wherein said apparatus comprises apparatus for blow molding an article having a plurality of openings thereinto; wherein said means for inserting a parison into a cavity of the mold and said means for injecting fluid into the mold-contained parison are operably associated with a first opening in said mold; and wherein said passage through a wall of the mold in which said sleeve means is slidably mounted comprises a second opening in said mold.

10. Apparatus in accordance with claim 9 wherein said first end of said mandrel means comprises means for piercing said parison during movement of said mandrel means from its first position to its second position.

11. Apparatus in accordance with claim 10 wherein said first end of said mandrel means comprises a tapered point means for piercing said parison during movement of said mandrel means from its first position to its second position.

12. Apparatus in accordance with claim 11 wherein said first end means of said sleeve means has first and second annular portions of different elevations, said first annular portion being of a configuration for contacting said shoulder of said passage when said sleeve means is in its second position, and said second annular portion being located inwardly from said first annular portion and being spaced from said shoulder of said passage when said sleeve means is in its second position.

13. Apparatus in accordance with claim 12 wherein said means for moving said sleeve means between its first and second positions and said means for moving said mandrel means between its first and second positions comprise separate means for moving, each being operable independently of the other.

14. Apparatus in accordance with claim 13 wherein said second end portion of said mandrel means is of a cylindrical configuration.

15. Apparatus in accordance with claim 14 additionally comprising means for forming a neck about the opening of said hollow article, said means for forming a neck comprising the diameter of said second end portion of said mandrel means being less than the diameter of said passage adjacent the mold cavity.

16. Apparatus in accordance with claim 1 wherein said first end of said mandrel means comprises a tapered point means for piercing said parison during movement of said mandrel means from its first position to its second position.

17. Apparatus in accordance with claim 1 wherein said means for moving said sleeve means between its first and second positions and said means for moving said mandrel means between its first and second positions comprise separate means for moving, each being operable independently of the other.

18. Apparatus in accordance with claim 17 wherein said first end of said mandrel means comprises a tapered point means for piercing said parison during movement of said mandrel means from its first position to its second position.

* * * * *